(12) United States Patent
Gassho et al.

(10) Patent No.: US 7,170,620 B2
(45) Date of Patent: Jan. 30, 2007

(54) PRINT JOB MANAGEMENT APPARATUS

(75) Inventors: Kazuhito Gassho, Nagano-ken (JP); Noriyuki Nagai, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 901 days.

(21) Appl. No.: 09/988,037

(22) Filed: Nov. 16, 2001

(65) Prior Publication Data

US 2002/0060806 A1     May 23, 2002

(30) Foreign Application Priority Data

Nov. 21, 2000     (JP)     ............... 2000-354358

(51) Int. Cl.
| | |
|---|---|
| G06K 1/00 | (2006.01) |
| G06F 3/12 | (2006.01) |
| G06F 13/14 | (2006.01) |
| G06F 19/00 | (2006.01) |
| B41B 27/40 | (2006.01) |

(52) U.S. Cl. .............. 358/1.15; 358/403; 358/444; 715/530; 707/7

(58) Field of Classification Search ............ None
See application file for complete search history.

(56) References Cited

U.S. PATENT DOCUMENTS

| | | | | |
|---|---|---|---|---|
| 5,046,166 A | * | 9/1991 | Takayanagi ............... | 358/300 |
| 5,164,842 A | * | 11/1992 | Gauronski et al. .......... | 358/401 |
| 5,327,526 A | * | 7/1994 | Nomura et al. ............ | 358/1.16 |
| 5,517,316 A | * | 5/1996 | Hube ....................... | 358/296 |
| 6,160,629 A | * | 12/2000 | Tang et al. ................ | 358/1.1 |
| 6,213,652 B1 | * | 4/2001 | Suzuki et al. ............. | 358/1.15 |
| 2002/0030851 A1 | * | 3/2002 | Wanda ..................... | 358/1.15 |
| 2004/0252322 A1 | * | 12/2004 | Gassho et al. ............. | 358/1.14 |

FOREIGN PATENT DOCUMENTS

JP     07-299936     11/1995

OTHER PUBLICATIONS

International Standard ISO/IEC10175-1:1996(E), Document Printing Application (DPA)—Part 1: Abstract service definition and procedures, 1st Ed., pp. 66-68, 116.*
Abstract of Japanese Patent Publication No. 07-299936, Pub. Date: Nov. 14, 1995, Patent Abstracts of Japan.
International Standard ISO/IEC10175-1:1996(E), Information Technology-Text and Office Systems-Document Printing Application (DPA)-Part 1: Abstract service definition and procedures, pp. i-xviii, 1-76, 79-271, and 273-486.

* cited by examiner

*Primary Examiner*—Twyler Lamb
*Assistant Examiner*—Myles D. Robinson
(74) *Attorney, Agent, or Firm*—Martine Penilla & Gencarella, LLP (57) ABSTRACT

The technique of the present invention facilitates execution of proof printing, prior to main printing. In a printing system constructed via a network LAN, a printer PRT includes a job management apparatus that manages statuses of print jobs in conformity with International Standard ISO/IEC10175-1. The job management apparatus has a proofComplete control module 6 in addition to diverse functional blocks for processing the print jobs based on the International Standard. The proofComplete control module 6 functions to hold a print job with attribute information representing proof printing after conclusion of proof printing. Separate management of the print job with the proof printing attribute enables a single print job to be utilized for both proof printing and main printing. This arrangement effectively enhances the utility.

6 Claims, 10 Drawing Sheets

STATUS MANAGEMENT TABLE

| ID | Statuses | Instructions | Attribute Infromation |
|---|---|---|---|
| 1 | pending | | |
| 2 | held | release | |
| 3 | printing | | |
| 4 | pending | | |
| 5 | retained | | |
| 6 | proof Complete | | |
| 7 | interPreting | hold | |

PRINT JOB MANAGEMENT APPARATUS

BACKGROUND OF THE INVENTION

1. Field of the Invention

The present invention relates to a print job management system that receives a plurality of print jobs from, for example, computers, and manages the plurality of print jobs to be adequately printed with printers.

2. Description of the Related Art

With spread of LANs (Local Area Networks), the system, in which a plurality of computers connecting with a network (hereinafter referred to as 'clients') share one or multiple printers also connecting with the network, becomes popular. Multiple print jobs are transmitted from the clients to each printer. Each printer is provided with an internal or external spool buffer for storing the transmitted print jobs. The print jobs are temporarily registered in the spool buffer and successively transferred to the printer to be printed.

Figure 1:
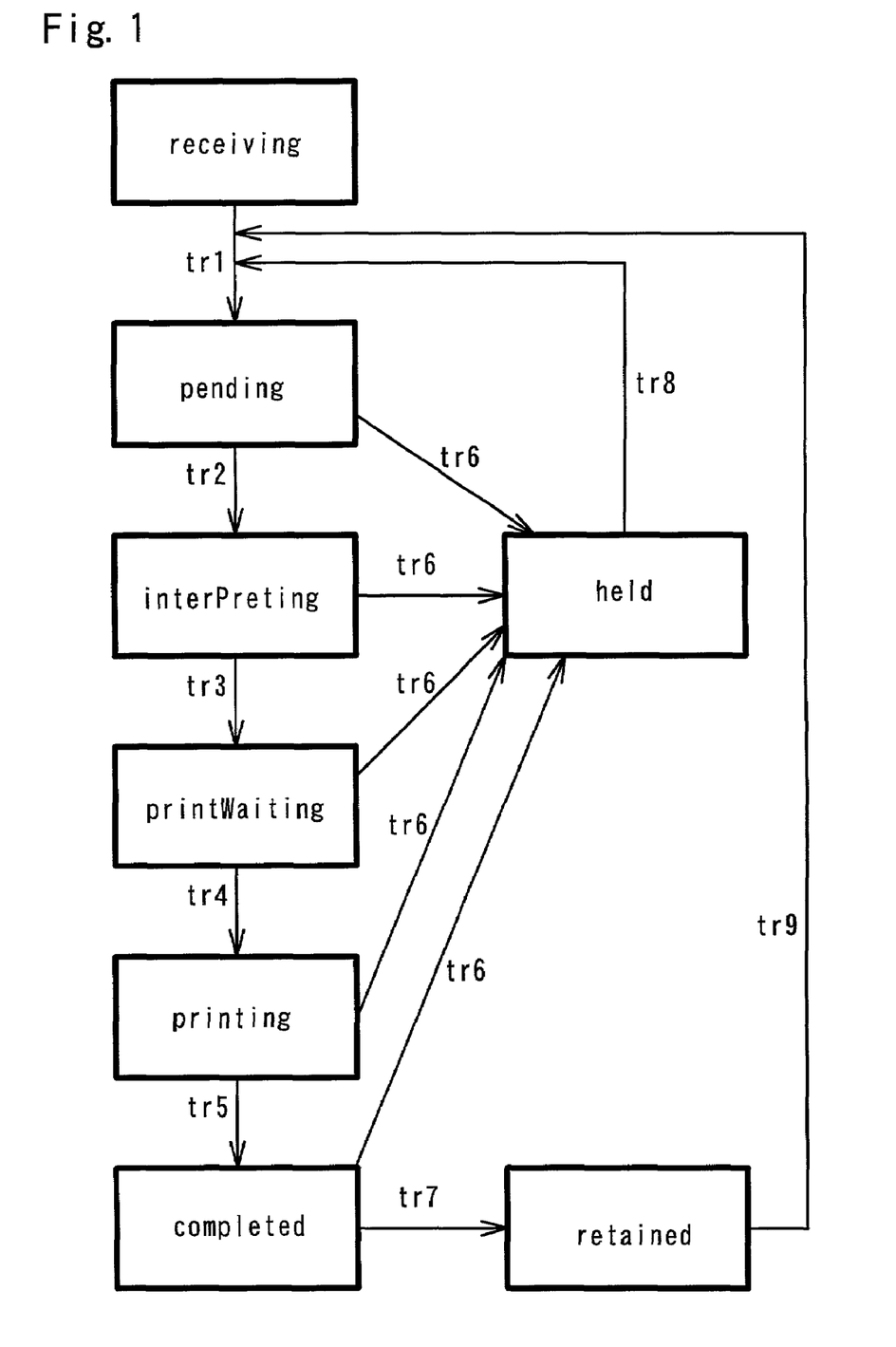
FIG. 1 shows the outline of the statuses defined by International Standard ISO/IEC10175-1.

The print job is printed through diverse statuses. The spool buffer manages print jobs based on these statuses. The statuses are defined by International Standard ISO/IEC10175-1. FIG. 1 shows the outline of the statuses defined by International Standard ISO/IEC10175-1. Only the main statuses are illustrated here.

The status 'receiving' means that the buffer is now receiving a print job transmitted from the client. The status of the print job that has been received by the buffer is shifted to 'pending' (see the arrow tr1). The status 'pending' means that the received print job is added to a waiting queue of printing operation. The print jobs added to the waiting queue are successively executed according to a predetermined order of priority.

The status of the print job, which should be processed currently, is shifted from 'pending' to 'interPreting' (see the arrow tr2). The print jobs are described in diverse protocols and languages, for example LPR and PostScript. It is accordingly required to interpret the contents of data in each print job and convert the data of the print job into data intrinsic to the printer used for printing. The status 'interPreting' means that such data conversion is being carried out.

After completion of the interpreting, the status of the print job is shifted to 'printWaiting' (see the arrow tr3). The status 'printWaiting' means that the print job is waiting until the printer gets ready for printing.

When the printer is read for printing, the print job is transferred to the printer and is printed. This further shifts the status of the print job to 'printing' (see the arrow tr4). On completion of the printing operation, the status is changed to 'completed' (see the arrow tr5). In general, the print job is eliminated and the job management is concluded at this moment.

An instruction to retain for a preset time period after conclusion of printing may be attached to the print job. In such cases, the status of the print job is further shifted from 'completed' to 'retained' (see the arrow tr7). The status 'retained' means that the print job is not eliminated but is kept until either of conditions, that is, input of a user's reprinting instruction and elapse of a predetermined time period, is fulfilled. In response to input of a user's reprinting instruction via the client or an interface of the printer, the status of the print job is shifted from 'retained' to 'pending' (see the arrow tr9). The process of job management newly creates a print job identical with the print job in the 'retained' status and keeps the newly created print job in the 'pending' status. Namely the job management assigns different pieces of identification information, for example, job number or indexes to the existing print job in the 'retained' status and the newly created print job in the 'pending' status.

There is often an additional function of holding execution of the print job, in addition to the series of processing flow discussed above. This function results in a 'held' status. The shift to the 'held' status is implemented in response to input of a user's instruction via the client or the interface of the printer. The shift to the 'held' status is allowed from any of the 'pending', 'interPreting', 'printWaiting', and 'completed' statuses (see the arrows tr6). The shift to the 'held' status is otherwise implemented by attaching data, which represents an instruction of a shift to the 'held' status, to the print job. The print job in the 'held' status is kept in the current state until input of a user's instruction. In response to a user's release instruction, the status of the print job is again shifted to 'pending' (see the arrow tr8). The print job in the 'held' status may alternatively be eliminated in response to a user's discarding instruction.

The statuses 'held' and 'retained' are similar to each other in some sense, since the print job is kept in either of these statuses. There is, however, a distinct difference between these two statuses. The shift to the 'retained' status is allowed only after execution of the print job, while there is no such a restriction with regard to the shift to the 'held' status. Execution of a print job in the 'retained' status accompanies creation of a new print job, whereas execution of a print job in the 'held' status does not accompany creation of a new print job. Namely the print job itself kept in the 'held' status is executed in the latter case. The print job in the 'retained' status is generally eliminated after elapse of a predetermined time period. The print job in the 'held' status is, however, kept without any time limit.

The job management apparatus functions to manage the statuses of the respective print jobs and control execution of the respective print jobs. The job management apparatus is conventionally constructed by a software program called a spooler inside the printer or a print server separate from the printer.

The job management within the range defined by the International Standard, however, may cause insufficient utility in printing practice. IN Proof printing is sometimes demanded prior to main printing of multiple copies, for example, in order to check the layout or other details of a document or check the printing density or other settings in a printer. Proof printing is conventionally carried out by outputting a print job with specification of only one copy. Namely another print job, which is different from the print job for main printing, is used for proof printing. It is accordingly required to transmit a new print job with specification of a desired number of copies for main printing. This results in poor utility. In order to adjust the settings in the printer, for example, the printing density, the print job for proof printing should be transmitted many times. This also results in poor utility.

SUMMARY OF THE INVENTION

At least part of the problems discussed above is solved in the job management apparatus that manages statuses of print jobs in conformity with International Standard ISO/IEC10175-1(hereinafter simply referred to as the 'International Standard'). The present invention thus adopts an arrangement that enables a single print job to be utilized for both proof printing and main printing.

In a first application of the present invention, statuses under management include a 'proof printing held' status intrinsic to proof printing, in addition to statuses defined by the International Standard. A job management apparatus of the first application has a holding module and a cancellation module that take charge of shifting the status of a print job to or from the 'proof printing held' status. The holding module shifts the status of a print job with attribute information representing proof printing to the 'proof printing held' status after conclusion of a preset cycle of proof printing. The cancellation module shifts the print job from the 'proof printing held' status to a printable status in response to an externally input printing instruction.

In the first application, the additional 'proof printing held' status enables a single print job to be readily utilized for both proof printing and main printing. The print job is generally eliminated after conclusion of printing. The print job with the proof printing attribute information is shifted to the 'proof printing held' status on conclusion of printing, and is thus not eliminated. The attribute information representing proof printing may be specified in the process of outputting the print job from a client, or may be added in response to an individually input instruction after the job management apparatus receives the print job.

Either of the 'held' status and the 'retained' status defined by the International Standard may be used for simply retaining print jobs. In this case, print jobs for proof printing and other print jobs coexist in an identical status. This leads to rather troublesome management. In the arrangement of the present invention, however, the 'proof printing held' status distinctly shows that proof printing of the print job has been concluded and that the print job waits for input of a main printing instruction. This arrangement facilitates management of the print jobs.

In the first application of the present invention, the print job is shifted to the 'proof printing held' status while keeping the attribute information representing proof printing. This arrangement enables proof printing of a print job to be readily executed in a repeated manner. Unless the attribute information is deleted, the print job once released from the 'proof printing held' status is again shifted to the 'proof printing held' status after execution of printing. This is especially effective when repeated proof printing is demanded, for example, to adjust the printing density in a printer. Deletion of the attribute information at an adequate timing attains main printing.

The timing of deletion of the attribute information is, for example, when the holding module shifts the status of the print job to 'proof printing held'. This timing is applicable in the case where only one cycle of proof printing is sufficient.

In another example, the cancellation module deletes the attribute information under a predetermined condition. The predetermined condition may be that the frequency of proof printing reaches a preset number or that a main printing instruction is input. This arrangement enables proof printing of a print job to be readily executed in a repeated manner.

The job management apparatus of the first application may also manage the number of copies to be printed. When the print job has attribute information representing the number of copies to be printed, the attribute information representing the number of copies may be updated according to execution of proof printing, so that the specified number of copies include proofs. The attribute information may be updated with the shift of the status by the holding module or the cancellation module. This arrangement effectively prevents waste of proof prints.

One applicable procedure may update the specified number of copies to a value obtained by subtracting N copies (where N represents a natural number) from the specified number of copies when the N copies are for proof printing. This arrangement eventually gives the specified number of copies by all the cycles of proof printing and main printing.

Another applicable procedure may update the specified number of copies to a value obtained by subtracting one copy from the specified number of copies regardless of the number of copies for proof printing. This arrangement eventually gives the specified number of copies by the last cycle of proof printing and main printing.

A second application of the present invention divides an input single print job into a print job for proof reading and a print job for main printing and carries out management of the divided print jobs.

A job management apparatus of the second application accordingly has a job creation module, a proof printing module, and a main printing module. The job creation module creates at least one daughter job from a print job, to which a proof printing instruction is given, as a mother job. It is preferable that the newly created daughter job has various pieces of attribute information possessed by the mother job. The proof printing module selects one among the mother job and the at least one daughter job as a proof print job and shifts the proof print job to a printable status while holding a residual print job. The main printing module shifts the residual print job to a printable status in response to input of a main printing instruction.

The printable status includes the 'pending' status defined by the International Standard. The shift to the printable status allows execution of printing. Selective use of multiple jobs for proof printing and main printing ensures job management within the range of the statuses defined by the International Standard without defining an additional status intrinsic to proof printing. Elimination of the proof print job after conclusion of proof printing does not affect main printing. This relatively facilitates management of print jobs.

One preferable embodiment of the second application attaches attribute information, which regards a mapping of the selected print job executed by the proof printing module to the residual print job, to at least either of the selected print job and the residual print job. The attribute information may be attached to the print job in the process of creating the daughter job by the job creation module. The residual print job, that is, the print job for main printing is readily identified, based on the attribute information.

In the second application, the status of the proof print job may be shifted to either 'held' or 'retained' after conclusion of the proof print job. This arrangement enables the same proof print job to be utilized iteratively for proof printing.

A third application of the present invention creates a daughter job from a print job, to which a proof printing instruction is given, as a mother job, after conclusion of proof printing, where attribute information of the daughter job with regard to at least a number of copies to be printed has a predetermined relation to corresponding attribute information of the mother job. A shift of the daughter job to a printable status attains main printing. The 'retained' status defined by the International Standard is similar to the third application from the viewpoints that the print job is retained after conclusion of printing and that a new print job is created in response to a reprinting instruction. The third application is, however, different from reprinting of the print job in the 'retained' status, since the attribute information of the daughter job with regard to at least the number of copies is related to the corresponding attribute information of the mother job in the process of creating the daughter job from the mother job. The arrangement of keeping the attribute information does not require specification of the number of copies anew when a main printing instruction is given. The predetermined relation of the attribute information may be that the attribute information of the daughter job is completely identical with the attribute information of the mother job or that a value obtained by subtracting the number of proofs from the number of copies specified by the mother job is registered as the attribute information of the daughter job.

The technique of the present invention is not restricted to the job management apparatus that manages the statuses of print jobs in conformity with the International Standard, but is applicable to any job management apparatus that manages the statuses of print jobs to be executed with a printing apparatus.

The present invention may be actualized by diverse applications other than the job management apparatus discussed above, for example, a print job management method, a recording medium in which a program for managing print jobs is recorded, and the program. Typical examples of the recording medium include flexible disks, CD-ROMs, magneto-optic discs, IC cards, ROM cartridges, punched cards, prints with barcodes or other codes printed thereon, internal storage devices (memories like a RAM and a ROM) and external storage devices of the computer, and a variety of other computer readable media.

These and other objects, features, aspects, and advantages of the present invention will become more apparent from the following detailed description of the preferred embodiments with the accompanying drawings.

DESCRIPTION OF THE PREFERRED EMBODIMENTS

Figure 2:
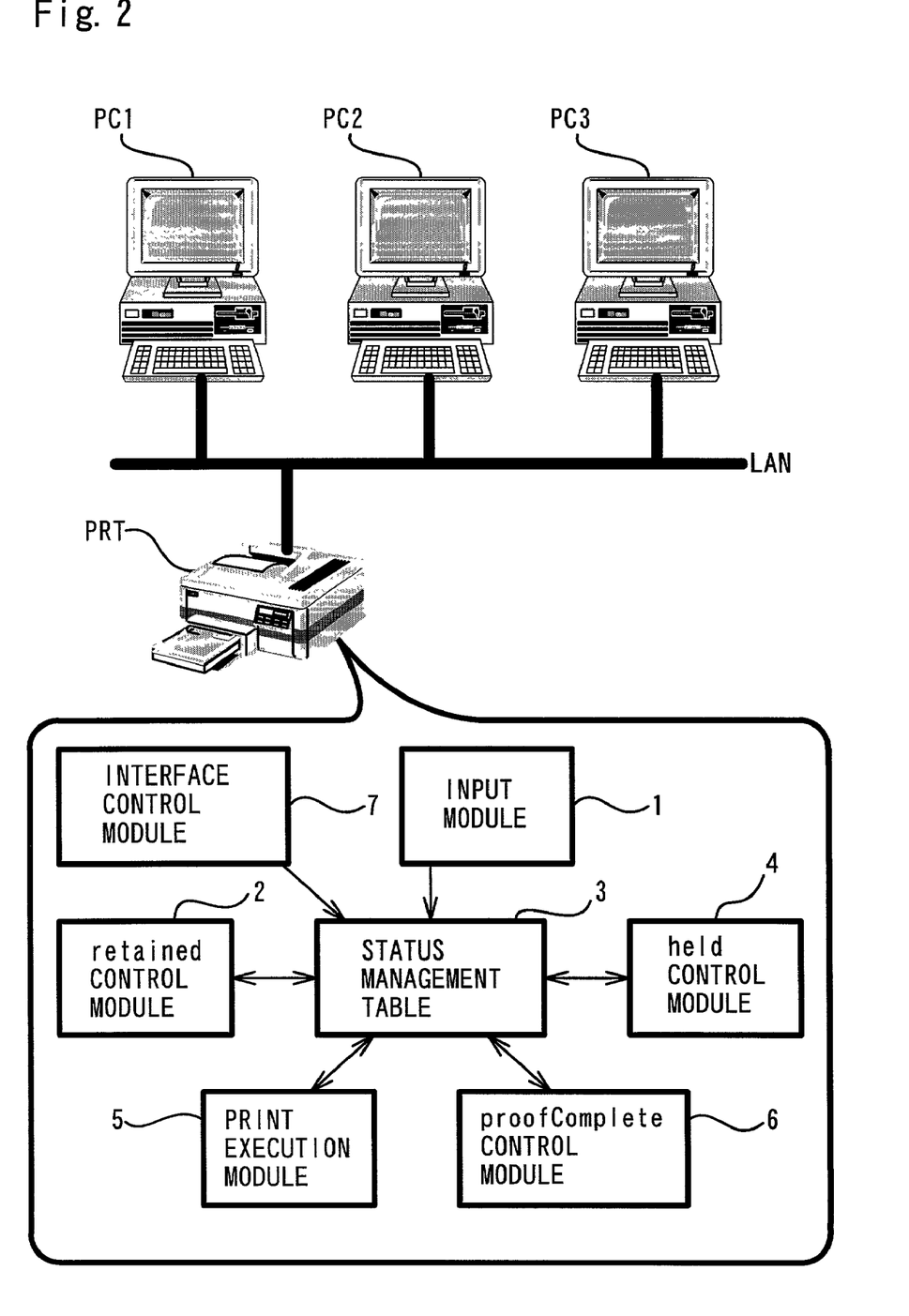
FIG. 2 illustrates the structure of a printing system with a job management apparatus in one embodiment of the present invention.

Some modes of carrying out the present invention are discussed below as preferred embodiments in the following sequence:
A. System Construction
B. Proof Printing Process
C. Second Embodiment
D. Third Embodiment A. System Construction FIG. 2 illustrates the structure of a printing system with a job management apparatus in one embodiment of the present invention. Client computers PC1 to PC3 and a printer PRT are mutually connected via a LAN (Local Area Network). The numbers of the client computers and the printers are not restricted to this embodiment.

Each of the client computers PC1 to PC3 is a general-purpose computer and creates documents and images according to various applications. Multiple print jobs including data of the documents and images thus created are output from the client computers PC1 to PC3 to the printer PRT. The respective print jobs are converted into packets according to a predetermined communication protocol and transmitted to the printer PRT via the LAN. The printer PRT includes a spool buffer, in which the transmitted print jobs are temporarily registered. The printer PRT manages the statuses of the multiple print jobs transmitted from the client computers PC1 to PC3 and successively carries out the printing operations.

In the structure of this embodiment, the job management apparatus for managing statuses of print jobs is incorporated in the printer PRT. The printer PRT has a microcomputer including a CPU, a ROM, and a RAM as a control unit for controlling the printing operations. The job management apparatus is attained by the software configuration utilizing this control unit. Functional blocks constituting the job management apparatus are illustrated in FIG. 2. The job management apparatus of the embodiment manages the statuses of the print jobs in conformity with International Standard ISO/IEC10175-1(hereinafter simply referred to as the 'International Standard').

Figure 3:
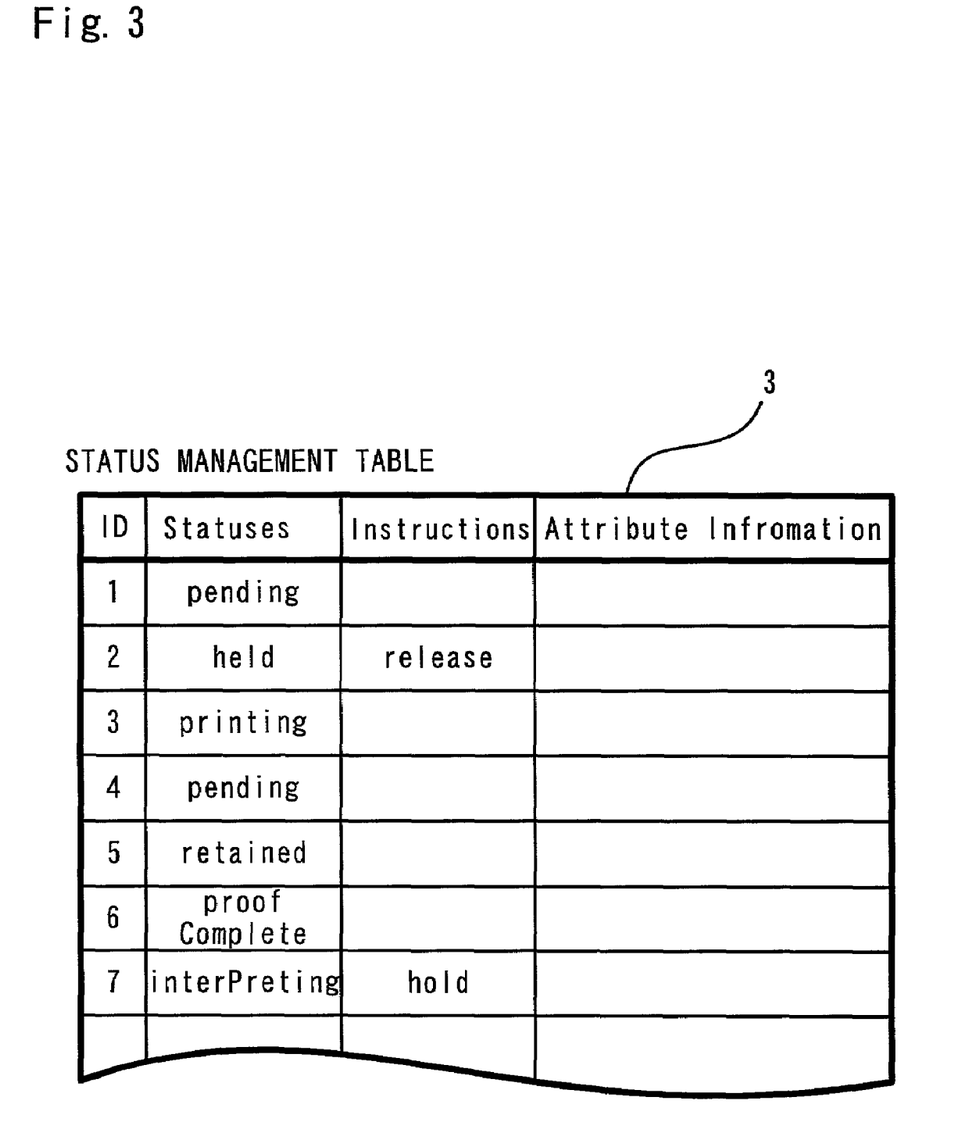
FIG. 3 shows the outline of a status management table.

The statuses of the print jobs are managed by a status management table 3. The respective functional blocks included in the job management apparatus gain access to the status management table 3, perform the functions assigned thereto, and cooperate with one another via the status management table 3.

FIG. 3 schematically illustrates the status management table 3. The job management apparatus assigns identification indexes ID to the respective print jobs for the purpose of management. The indexes ID are also mapped to storage positions (pointers) of the respective print jobs in the spool buffer.

The status, the instruction, and the attribute information of each print job corresponding to each index ID are stored in the status management table 3. The status represents one of the respective statuses in conformity with the International Standard illustrated in FIG. 1. The instruction may be input from any of the client computers PC1 to PC3 via the LAN or input via an interface of the printer PRT to make each print job subjected to required processing. The attribute information includes settings of the printing operations, for example, the number of copies to be printed and paper settings. In this embodiment, information representing 'proof printing' (hereinafter may be referred to as 'proof attribute') is also included in the attribute information.

Referring back to FIG. 2, the other functional blocks of the job management apparatus are discussed. An input module 1 functions to input instructions transmitted from the client computers PC1 to PC3 via the network. An interface control module 7 functions to control the input from the interface incorporated in the main body of the printer PRT. These inputs are reflected on the 'instruction' information in the status management table 3. In the example of FIG. 3, instructions 'release' and 'hold' are input respectively to jobs 2 and 7. The meanings of these instructions will be discussed later with the other functional blocks.

A held control module 4 processes print jobs in the 'held' status defined by the International Standard. The held control module 4 first detects print jobs in the 'held' status based on the status information stored in the status management table 3. Each of the detected print jobs undergoes some processing corresponding to the instruction information within a range in conformity with the International Standard. One of the typical processes executed by the held control module 4 is 'release'. The instruction 'release' is a print job shifting instruction based on the International Standard. The print job in the 'held' status is simply shifted to the 'pending' status, in response to the 'release' instruction. The shift is implemented by updating the status information of each print job.

A proofComplete control module 6 processes a print job in a 'proofComplete' status. In the example of FIG. 3, a job 6 is set in this status. The 'proofComplete' is a unique status provided in this embodiment, in addition to the statuses following the International Standard. The 'proofComplete' status is proper to print jobs having the proof attribute and is set until input of a next instruction after conclusion of proof printing. When a proof printing instruction is given again to the print job in this 'proofComplete' status, the proofComplete control module 6 shifts the status of the print job to 'pending'. In response to input of a main printing instruction to carry out not the proof printing but main printing, the proofComplete control module 6 deletes the proof attribute from the print job and shifts the status of the printing job to 'pending'.

Referring back again to FIG. 2, a print execution module 5 is discussed. The print execution module 5 processes each print job in one of the statuses 'pending', 'interPreting', 'printWaiting', 'printing', and 'completed' in conformity with the International Standard, based on the status information in the status management table 3.

The process determines whether or not the order of printing has reached a print job in the 'pending' status based on a waiting queue, and updates the status of the print job to 'interPreting' at the time when the order of printing has reached the print job. The process makes a print job in the 'interPreting' status undergo interpretation discussed previously and updates the status of the print job to 'printWaiting' at the time of conclusion of the interpretation. With regard to a print job in the 'printing' status, the process updates the status to 'completed' at the time of conclusion of printing. The number of copies specified by the attribute information are printed. With regard to a print job having the proof attribute, however, only one copy is printed as a proof, regardless of the specified number of copies.

With regard to a print job in the 'completed' status, the process in principle eliminates the print job or shifts the status to 'retained', based on the attribute information attached to the print job. In this embodiment, a print job may include attribute information representing proof printing. The print execution module 5 shifts the status of the print job having the proof attribute to 'proofComplete' on conclusion of proof printing. The print job having the proof attribute is then under management of the proofComplete control module 6 discussed above.

When an instruction 'hold' for shifting the status to 'held' is given to the print job in any of the 'pending', 'interPreting', 'printWaiting', 'printing', and 'completed' statuses, the print execution module 5 updates the status information to 'held'.

In this embodiment, the print execution module 5 comprehensively carries out the processing according to each status. One possible modification may provide functional blocks for the respective statuses.

A retained control module 2 processes print jobs in the 'retained' status in conformity with the International Standard, based on the status information in the status management table 3. The retained control module 2 monitors a print job in the 'retained' status for the elapse of time since the start of the 'retained' status, and eliminates the print job when the elapse of time exceeds a preset time period. The preset time period is specified by the user. When a reprinting instruction 'reprint' is output prior to the elimination, the retained control module 2 creates a new print job from the print job in the 'retained' status and sets 'pending' to the status of the newly created print job.

Figure 4:
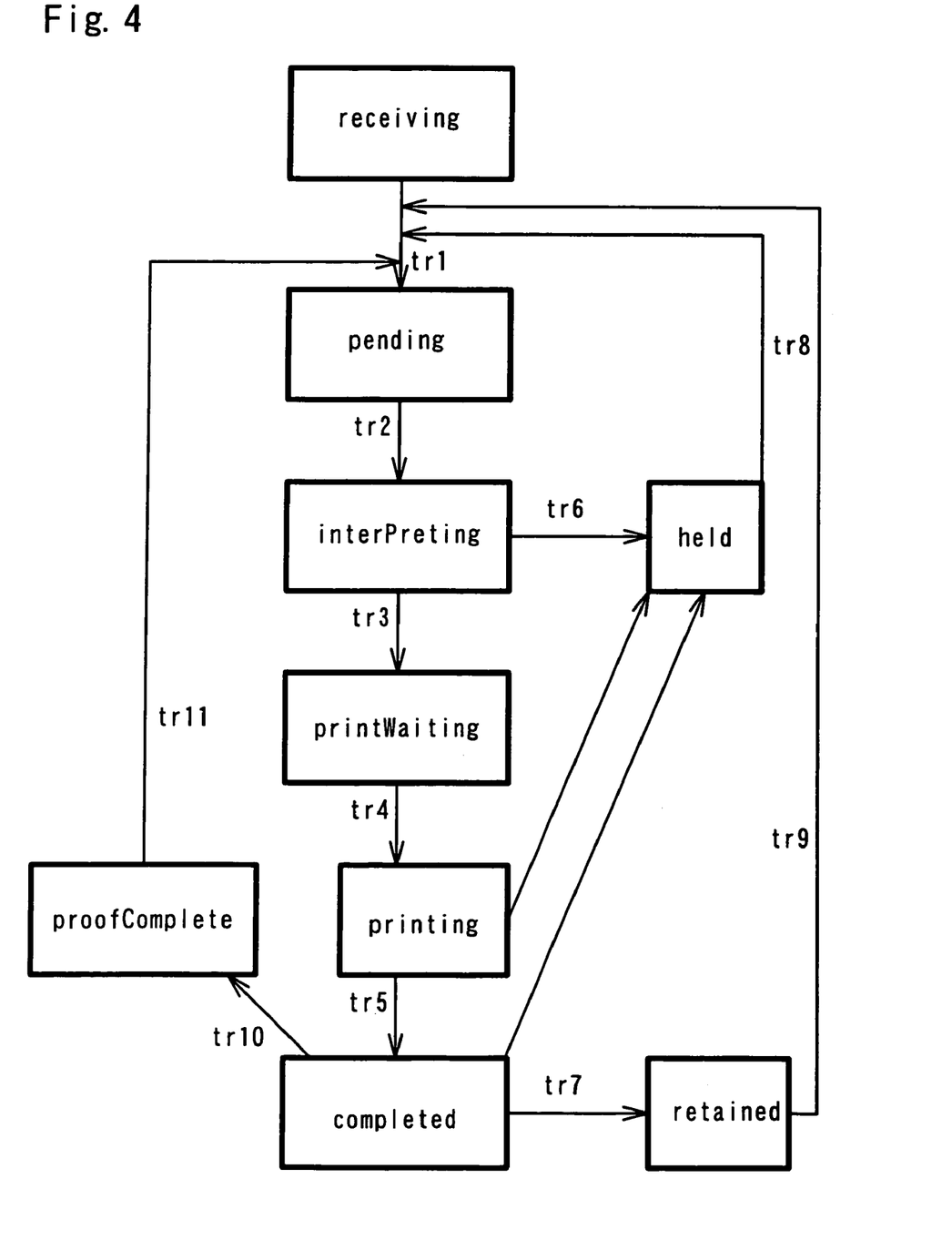
FIG. 4 shows a flow of changing the status of a print job.

FIG. 4 shows a flow of changing the status of a print job. Part of the flow identical with the flow of the status in conformity with the International Standard (see FIG. 1) is not specifically discussed here. In the structure of this embodiment, the 'proofComplete' status is newly provided. As discussed previously, the print job having the proof attribute is shifted from the 'completed' status to the 'proofComplete' status (see the arrow tr10). The print job may alternatively be shifted directly from the 'printing' status to the 'proofComplete' status. The print job set in the 'proofComplete' status is shifted to the 'pending' status in response to external input of an instruction (see the arrow tr11).

When a proof printing instruction is input again, the status of the print job is shifted to 'pending' while the print job keeps the proof attribute. On conclusion of the second cycle of proof printing, the print job is again set in the 'proof Compete' status based on the proof attribute.

In response to input of a main printing instruction, the status of the print job is shifted to 'pending' after deletion of the proof attribute from the print job. Since the proof attribute is deleted from the print job, on conclusion of main printing, the print job is processed in the same manner as standard print jobs and is thus either eliminated or shifted to the 'retained' status.

B. Proof Printing Process

Figure 5:
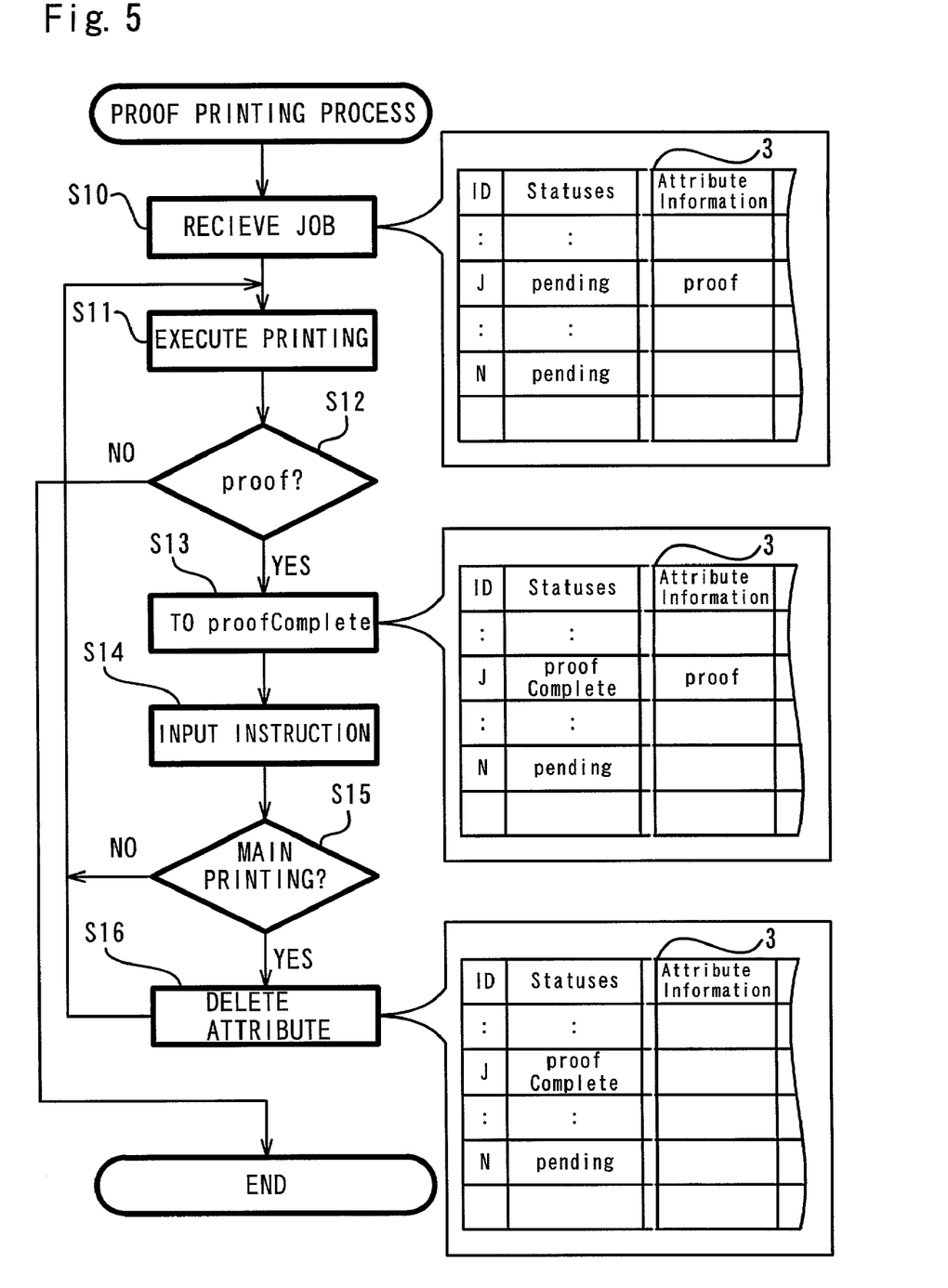
FIG. 5 is a flowchart showing a printing process routine including proof printing.

FIG. 5 is a flowchart showing a printing process routine including proof printing. The series of processing cooperatively executed by the functional blocks shown in FIG. 2 is shown with regard to a specific job.

The program starts the series of processing when receiving a print job at step S10. Here it is assumed that one of the received print jobs has the proof attribute. The contents of the status management table 3 are also illustrated in FIG. 5. The proof attribute is kept as the attribute information.

The print execution module 5 executes the print job in the 'pending' status at step S11. With regard to a print job with the proof attribute, that is, a print job with an index J, the print execution module 5 prints only one copy as a proof, regardless of the specified number of copies. With regard to a print job without the proof attribute, for example, a print job with an index N, the print execution module 5 prints the specified number of copies.

After conclusion of the printing operation, the print execution module 5 determines whether or not the processed print job has the proof attribute at step S12. When the processed print job does not have the proof attribute, the program exits from this processing routine without any further processing.

When the processed print job has the proof attribute, on the other hand, the status of the print job is shifted to 'proofComplete' at step S13. The shift is implemented by updating the status information. As illustrated in FIG. 5, the status of the print job with the index J is updated to 'proofComplete' as a result of this process.

The print job in the 'proofComplete' status waits for input of a printing instruction at step S14. The instruction is input from any of the client computers PC1 to PC3 or from the interface incorporated in the printer PRT. In the former case, the instruction is input via the input module 1. In the latter case, the instruction is input via an interface control module 7. The input instruction is reflected on the contents of the status management table 3.

The print job in the 'proofComplete' status is under management of the proofComplete control module 6. When it is determined at step S15 that the input instruction is not main printing, the proofComplete control module 6 shifts the status of the print job to 'pending'. Namely the status information of the print job is updated to 'pending'. This print job is executed by the print execution module 5 and is again shifted to the 'proofComplete' status based on the proof attribute.

When it is determined at step S15 that the input instruction is main printing, on the other hand, the proofComplete control module 6 deletes the proof attribute from the print job at step S16 and shifts the status of the print job to 'pending'. In the illustrated example, the process of step S16 deletes the proof attribute from the print job with the index J. This print job is executed by the print execution module 5. Since the proof attribute is deleted from the print job, the specified number of copies are printed. The printing process routine is concluded on the basis of decision at step S12.

As discussed above, the job management apparatus utilizes the status 'proofComplete' intrinsic to proof printing to allow both proof printing and main printing with regard to a single print job. This arrangement effectively prevents the print job from being mistakenly eliminated after proof printing, while preventing the print job from being left after main printing. Only one copy is printed for proof printing regardless of the specified number of copies, whereas the specified number of copies are printed for main printing. Namely the arrangement of this embodiment facilitates control of the number of copies to be printed.

The job management apparatus of the embodiment shifts the status of the print job to 'proofComplete' while the print job keeps the proof attribute. This allows iterative execution of proof printing. The iterative proof printing is effectively utilized, for example, to adjust the density of the printer.

One possible modification may delete the proof attribute from the print job in the process of shifting the status of the print job to 'proofComplete'. When it is expected that only one cycle of proof printing is sufficient, this modified structure advantageously facilitates job management.

In the structure of the first embodiment, the attribute regarding the number of copies to be printed is kept until main printing. One possible modification may update the attribute regarding the number of copies to be printed in response to execution of proof printing. The update may be performed, for example, when the proofComplete control module 6 shifts the status of the print job to 'pending'. The arrangement of decreasing the number of copies to be printed by one in response to each shift to the 'pending' status eventually gives the specified number of copies by proof printing and main printing. The arrangement of decreasing the number of copies to be printed in response to a main printing instruction, on the other hand, eventually gives the specified number of copies by the last cycle of proof printing and main printing. Updating the number of copies to be printed in either manner desirably prevents waste of the proof prints.

C. Second Embodiment

In the first embodiment, a single print job is used for both proof printing and main printing. The procedure of a second embodiment divides a print job into a print job for proof printing and a print job for main printing and executes proof printing.

Figure 6:
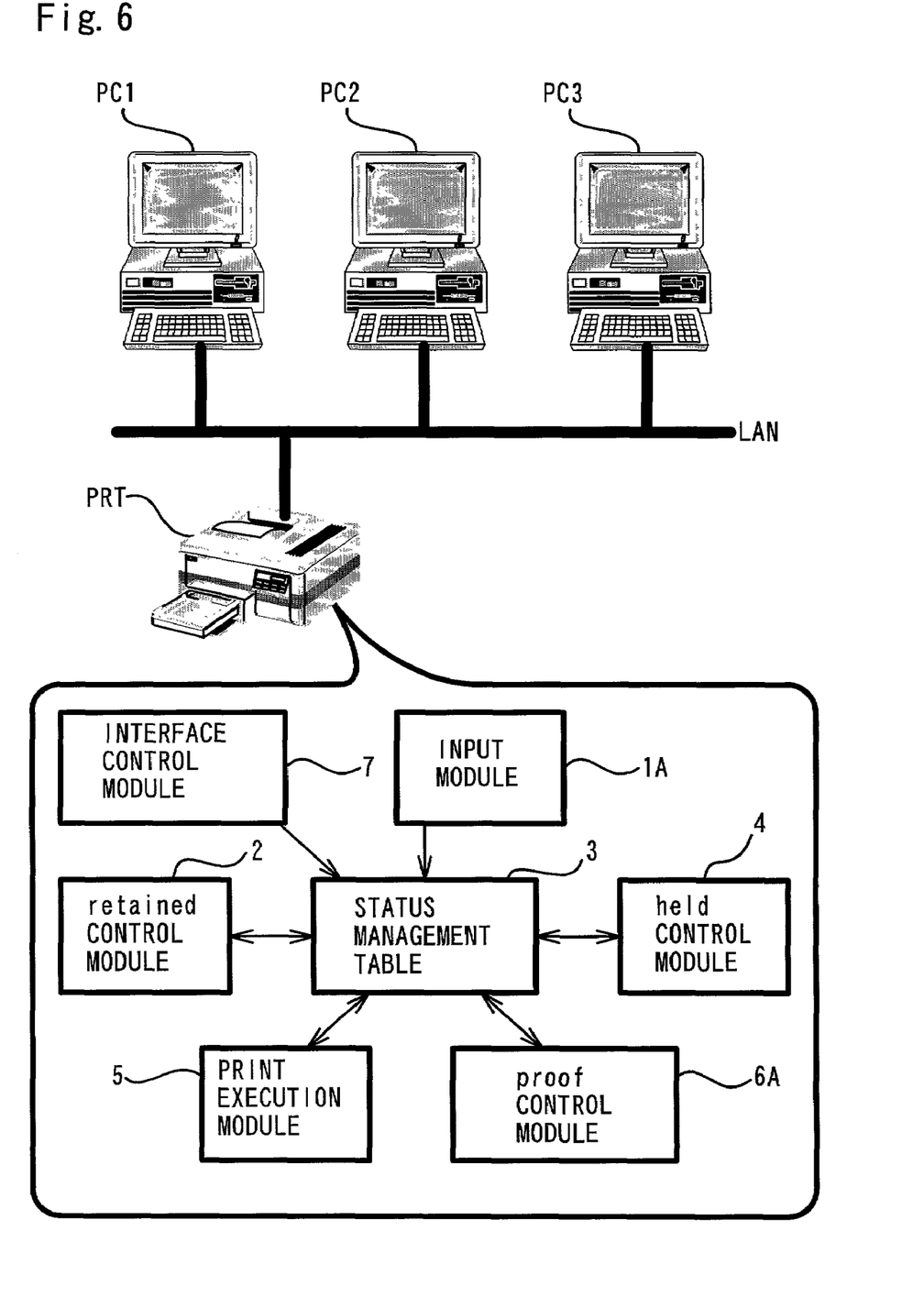
FIG. 6 shows functional blocks in a job management apparatus in a second embodiment of the present invention.

FIG. 6 illustrates functional blocks included in a job management apparatus in the second embodiment. Like the job management apparatus of the first embodiment, the job management apparatus of the second embodiment is attained by the software configuration utilizing this control unit. The functional blocks of the second embodiment are similar to those of the first embodiment, except that the proofComplete control module 6 is replaced by a proof control module 6A and that the functions of an input module 1A are different from those of the input module 1 of the first embodiment.

Figure 7:
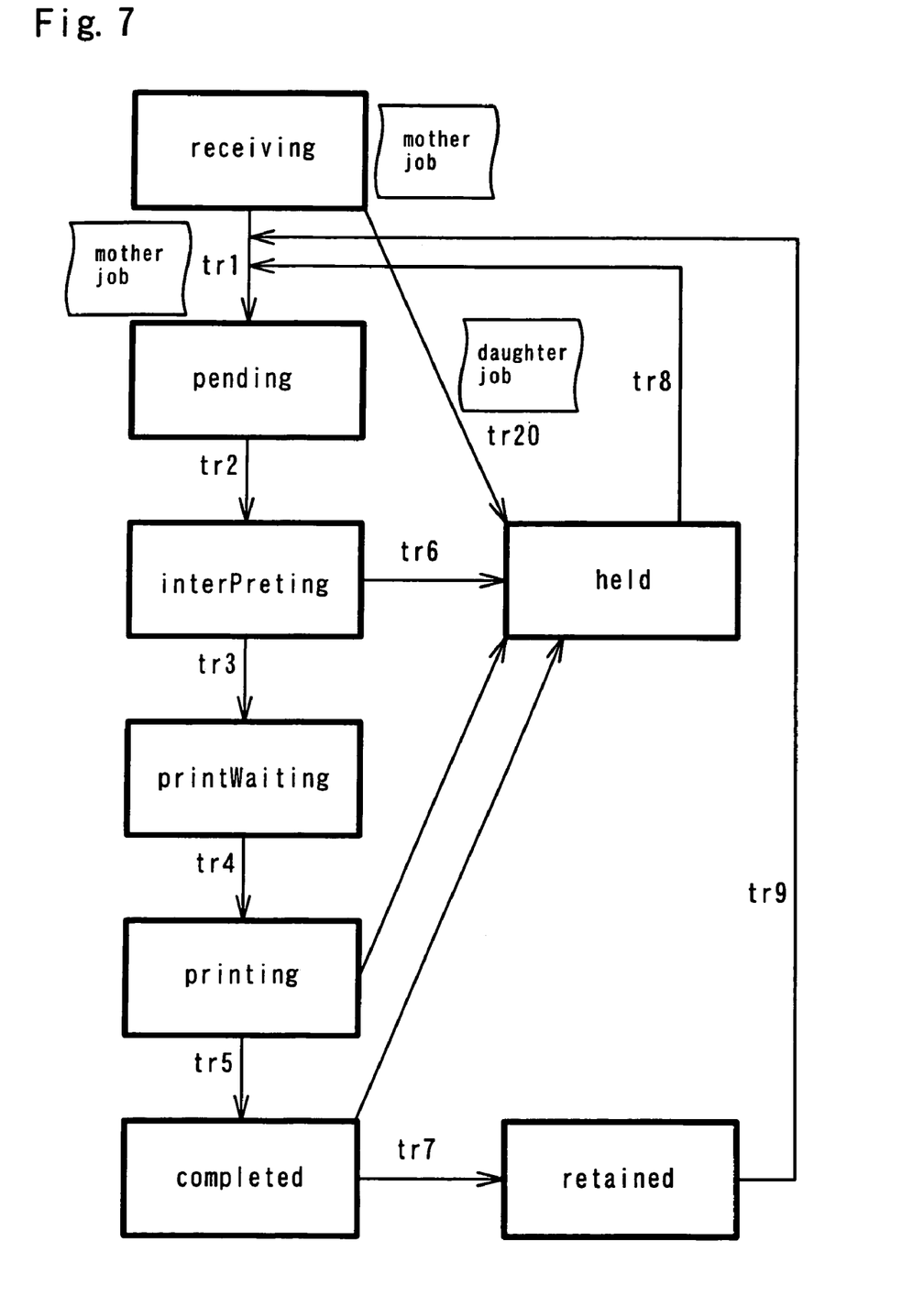
FIG. 7 shows a flow of changing the status of a print job in the second embodiment.

FIG. 7 shows a flow of changing the status of a print job in the second embodiment. This embodiment does not use any unique status but manages print jobs with statuses following the International Standard. In the structure of the second embodiment, a new shift from the 'receiving' status to the 'held' status is defined, in addition to the shifts based on the International Standard. In response to input of a print job having the proof attribute, the process newly creates a daughter job from the input print job as a mother job and shifts the status of the mother job to 'pending' and the status of the daughter job to 'held'. The daughter job is a duplicate of the mother job but does not have the proof attribute. New attribute information for identifying the daughter job (hereinafter referred to as 'daughter job attribute') is added to the mother job. This process is carried out by the input module 1A.

The status of the mother job is shifted through 'interPreting', 'printWaiting', 'printing' to 'completed' to implement the printing operation, while the mother job keeps the proof attribute. Since the print job has the proof attribute, only one copy is printed for proof printing regardless of the number of copies specified at the time of output of the print job as discussed in the first embodiment. The status of the mother job is shifted to 'retained' after completion of the printing operation.

The proof control module 6A processes the mother job, which has the proof attribute and is set in the 'retained' status. When a proof printing instruction is given again to the mother job, the mother job is again shifted to the 'pending' status (see the arrow tr9). More specifically, the proof control module 6A creates a new print job from the mother job in the 'retained' status and shifts the status of the mother job to the 'pending' status. The proof control module 6A executes this shift while keeping the proof attribute and the daughter job attribute.

In response to a main printing instruction given to the mother job, the proof control module 6A 'releases' the daughter job specified by the daughter job attribute from the 'held' status. Namely the status of the daughter job is changed from 'held' to 'pending'. At this moment, the mother job is eliminated. As the daughter job has the attribute information representing the specified number of copies to be printed, the specified number of copies are printed for main printing.

Figure 8:
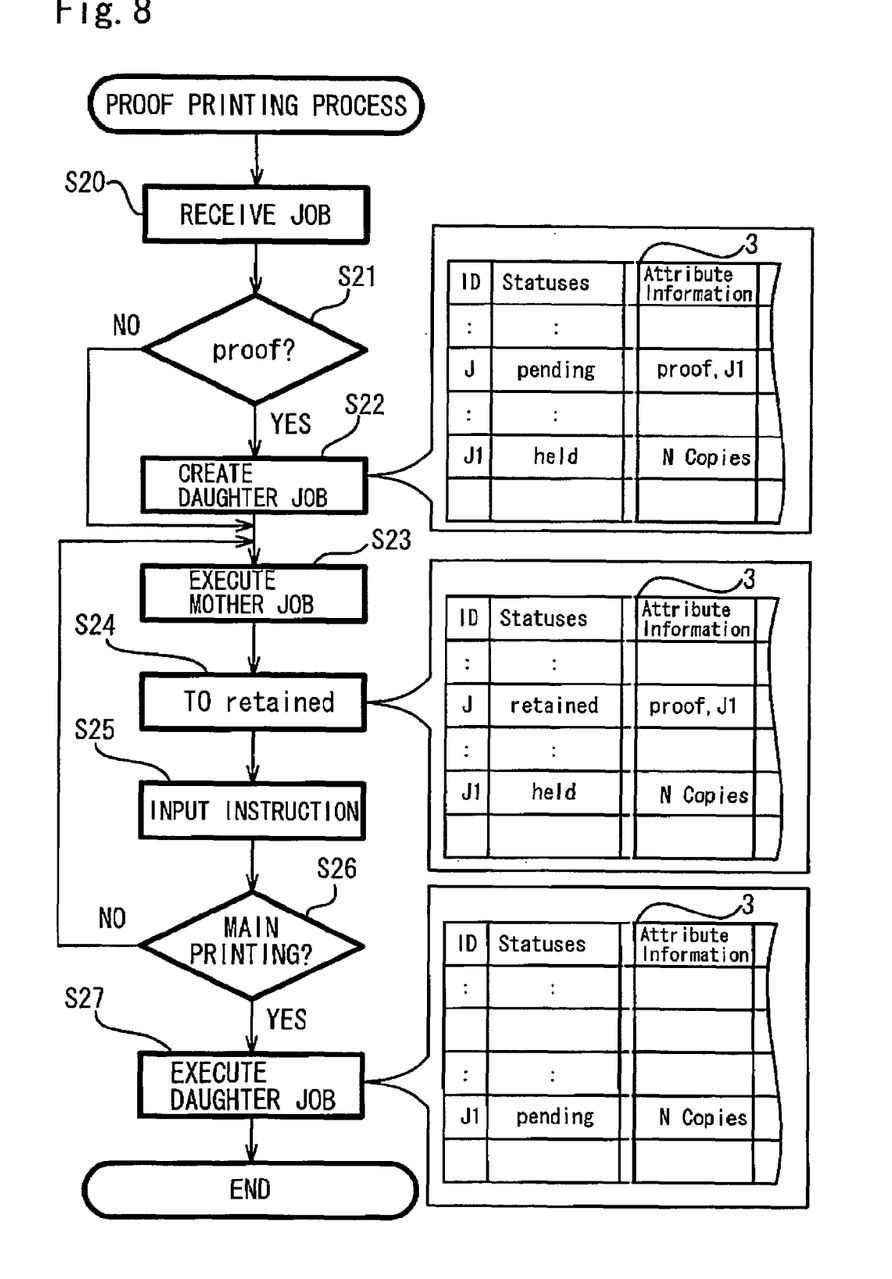
FIG. 8 is a flowchart showing a printing process routine executed in the second embodiment.

FIG. 8 is a flowchart showing a printing process routine executed in the second embodiment. In response to input of a print job at step S20, the input module 1A determines whether or not the input print job has the proof attribute at step S21. When the print job has the proof attribute, a daughter job is created from the input print job as the mother job at step S22. When the print job does not have the proof attribute, on the contrary, the program skips the process of step S22 and sets the input print job in the 'pending' status.

The contents of the status management table 3 in the case of creation of a daughter job are also illustrated in FIG. 8. A daughter job with an index J1 is created from a print job with an index J as the mother job. The mother job keeps the proof attribute. The index J1 of the daughter job is registered in the mother job as the daughter job attribute. While the proof attribute is deleted from the daughter job, the daughter job keeps the other attribute information, for example, the attribute information regarding the number of copies to be printed (N copies in the illustrated example). The mother job is set in the 'pending' status, whereas the daughter job is set in the 'held' status.

The print execution module 5 executes the mother job in the 'pending' status at step S23. Here only one copy is printed for proof printing, based on the proof attribute. After conclusion of the proof printing, the mother job is set in the 'retained' status at step S24 or alternatively in the 'held' status. As shown in FIG. 8, the status information of the mother job with the index J is updated to 'retained' after completion of the printing operation.

In response to an instruction given to the print job in the 'retained' status at step S25, the proof control module 6A processes the mother job. When it is determined at step S26 that the input instruction is not a main printing instruction, the proof control module 6A shifts the status of the mother job from 'retained' to 'pending' while keeping the proof attribute and the daughter job attribute. The second cycle of proof printing is then executed with the mother job.

When it is determined at step S26 that the input instruction is a main printing instruction, on the other hand, the proof control module 6A discards the mother job in the 'retained' status and executes the daughter job specified by the daughter job attribute, that is, the job with the index J1 in the 'held' status at step S27. As shown in FIG. 8, the status of the daughter job with the index J1 is thus shifted to 'pending', and the specified number of copies (N copies) are printed.

The job management apparatus of the second embodiment carries out printing by dividing a print job into a mother job for proof printing and a daughter job for main printing. This arrangement allows proof printing within the range of the statuses defined by the International Standard. Elimination of the print job for proof printing after completion of the proof printing does not affect the main printing. This arrangement thus relatively facilitates management of print jobs.

Like the first embodiment, in the structure of the second embodiment, the number of copies to be printed with the daughter job may be decreased by execution of proof printing with the mother job. Although the mother job is used for proof printing and the daughter job is used for main printing in the second embodiment, the inverse arrangement is also allowable. In the structure of the second embodiment, the daughter job attribute is registered in the mother job. Attribute information for identifying the mother job may alternatively be registered in the daughter job.

D. Third Embodiment

The procedure of the second embodiment carries out proof printing after creation of a daughter job from a print job having the proof attribute. The procedure of a third embodiment, on the other hand, creates a daughter job for main printing after execution of proof printing with a print job having the proof attribute.

A job management apparatus of the third embodiment has the same functional blocks as those of the second embodiment, with some difference in functions of the proof control module 6A.

Figure 9:
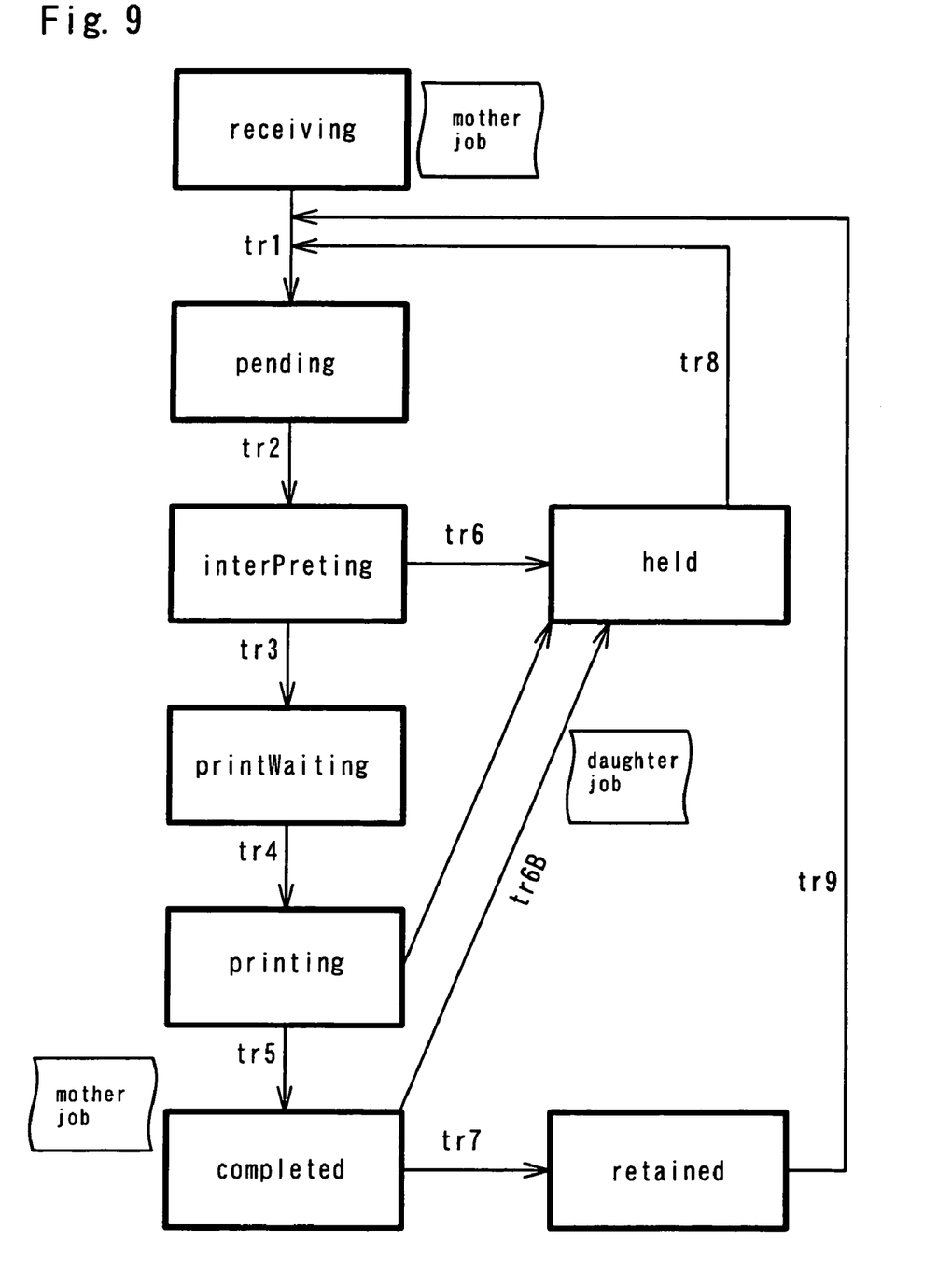
FIG. 9 shows a flow of changing the status of a print job in a third embodiment of the present invention.

FIG. 9 shows a flow of changing the status of a print job in the third embodiment. The process of the third embodiment executes printing while the print job having the proof attribute is kept in the 'pending' status. When the printing operation is completed, the process creates a new daughter job from the print job having the proof attribute as the mother job. The daughter job is a duplicate of the mother job but does not have the proof attribute. Attribute information for identifying the mother job (hereinafter referred to as the mother job attribute) is newly added to the daughter job. The status of the created daughter job is shifted to 'held' (see the arrow tr6B). In response to a main printing instruction given to the mother job, the process discards the mother job and releases the daughter job from the 'held' status to execute main printing.

Figure 10:
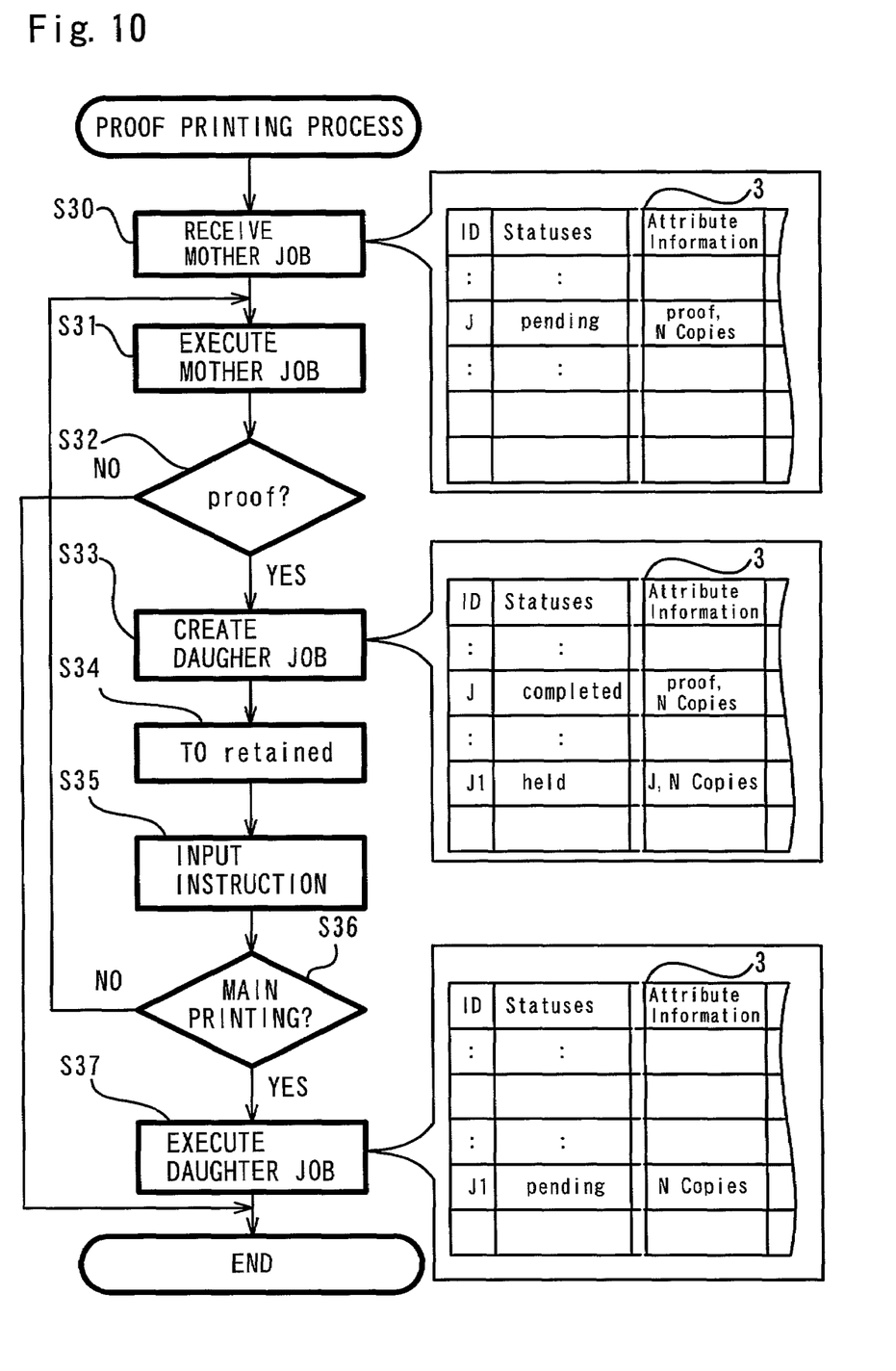
FIG. 10 is a flowchart showing a printing process routine executed in the third embodiment.

FIG. 10 is a flowchart showing a printing process routine executed in the third embodiment. A mother job is received at step S30, is set in the 'pending' status, and executed by the print execution module 5 at step S31. The contents of the status management table 3 are also illustrated in FIG. 10.

When it is determined at step S32 that the mother job has the proof attribute, the proof control module 6A creates a daughter job from the mother job at step S33. In the illustrated example, a daughter job with an index J1 is created from a mother job with an index J. The status of the daughter job is set in the 'held' status. The daughter job has attribute information representing the number of copies to be printed (N copies in the illustrated example). The index J of the mother job is also added as the mother job attribute to the daughter job. The status of the mother job is then shifted to 'retained' at step S34. The program then waits for input of an instruction to the mother job at step S35.

In response to input of the instruction, the proof control module 6A carries out processing. When it is determined at step S36 that the input instruction is a proof printing instruction to execute proof printing again, the proof control module 6A shifts the status of the mother job to 'pending'. The shift follows the International Standard and uses a new index. The concrete procedure creates a new daughter job from the mother job and shifts the status of the mother job to 'pending'. The mother job keeps the proof attribute.

When it is determined at step S36 that the input instruction is a main printing instruction, on the other hand, the proof control module 6A discards the mother job in the 'retained' status and executes the daughter job at step S37. The status of the daughter job with the index J1 is shifted to 'pending' in the illustrated example. The mother job attribute registered in the daughter job is utilized for mapping of the daughter job to the mother job. When a main printing instruction is given to the mother job that has the proof attribute and is set in the 'retained' status, the proof control module 6A retrieves print jobs in the 'held' status to find a print job having the mother job attribute of the index J. The process identifies the daughter job mapped to the mother job to which the main printing instruction is given and executes the identified daughter job.

Like the second embodiment, the procedure of the third embodiment attains proof printing by utilizing the statuses defined by the International Standard. Different from the arrangement of simply creating a new job and keeping the newly created job in the 'held' status, this arrangement allows the daughter job to keep the attribute information regarding the number of copies to be printed, which is possessed by the mother job, and does not require specification of the number of copies for main printing.

In the arrangement of the third embodiment, since the daughter job has the mother job attribute, no trouble arises in execution of main printing even in the case where the mother job in the 'retained' status is mistakenly eliminated. It is not essential that the mother job attribute is registered in the daughter job. As discussed in the second embodiment, the daughter job attribute may alternatively be registered in the mother job.

The above embodiments are to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein. Some examples of possible modification are given below.

The first through the third embodiments regards the job management apparatus constructed in the printer PRT. The job management apparatus may otherwise be constructed in a special print server connecting with the LAN or in any of the client computers. The functions of the job management apparatus may be attained by multiple servers in a distributive manner.

The first through the third embodiments regard the job management apparatus in conformity with the International Standard. The technique of the present invention is applicable to a job management apparatus that does not conform to the International Standard as long as the job management apparatus has a status corresponding to either the 'held' status or the 'retained' status discussed in the embodiments, that is, a status for holding execution of a print job under predetermined conditions.

The diverse control processes discussed above may be actualized by the hardware structure, instead of the software configuration.

The scope and spirit of the present invention are indicated by the appended claims, rather than by the foregoing description.

What is claimed is:

1. A job management apparatus that manages statuses of print jobs in conformity with International Standard ISO/IEC10175-1, wherein statuses under management include statuses defined by the International Standard and a 'proof printing held' status uniquely set for proof printing, said job management apparatus comprising:

a holding module that shifts a status of a print job with attribute information representing proof printing to the 'proof printing held' status after conclusion of a preset cycle of proof printing and deletion of the attribute information; and a cancellation module that shifts the print job from the 'proof printing held' status to a printable status in response to an externally input printing instruction.

2. A job management apparatus in accordance with claim 1, wherein said cancellation module deletes the attribute information under a predetermined condition and carries out the shift.

3. A job management apparatus in accordance with claim 2, wherein the predetermined condition is input of a main printing instruction.

4. A job management apparatus in accordance with claim 1, wherein the print job has attribute information representing a specified number of copies to be printed, and either one of said holding module and said cancellation module updates the attribute information representing the number of copies to be printed by execution of proof printing, so as to attain the specified number of copies including a proof.

5. A job management method that manages a status of a print job to be executed with a printing apparatus, said job management method comprising the steps of:

shifting a status of a print job with attribute information representing proof printing to a 'proof printing held' status after conclusion of a preset cycle of proof printing and deletion of the attribute information; and shifting the print job from the 'proof printing held' status to a printable status in response to an externally input printing instruction.

6. A recording medium in which a program for managing a status of a print job to be executed with a printing apparatus is recorded in a computer readable manner, said program causing a computer to attain the functions of:

shifting a status of a print job with attribute information representing proof printing to a 'proof printing held' status after conclusion of a preset cycle of proof printing and deletion of the attribute information; and shifting the print job from the 'proof printing held' status to a printable status in response to an externally input printing instruction.

* * * * *